C. LEMALE.
FLASH STEAM GENERATOR.
APPLICATION FILED NOV. 6, 1912.
1,102,345.
Patented July 7, 1914.
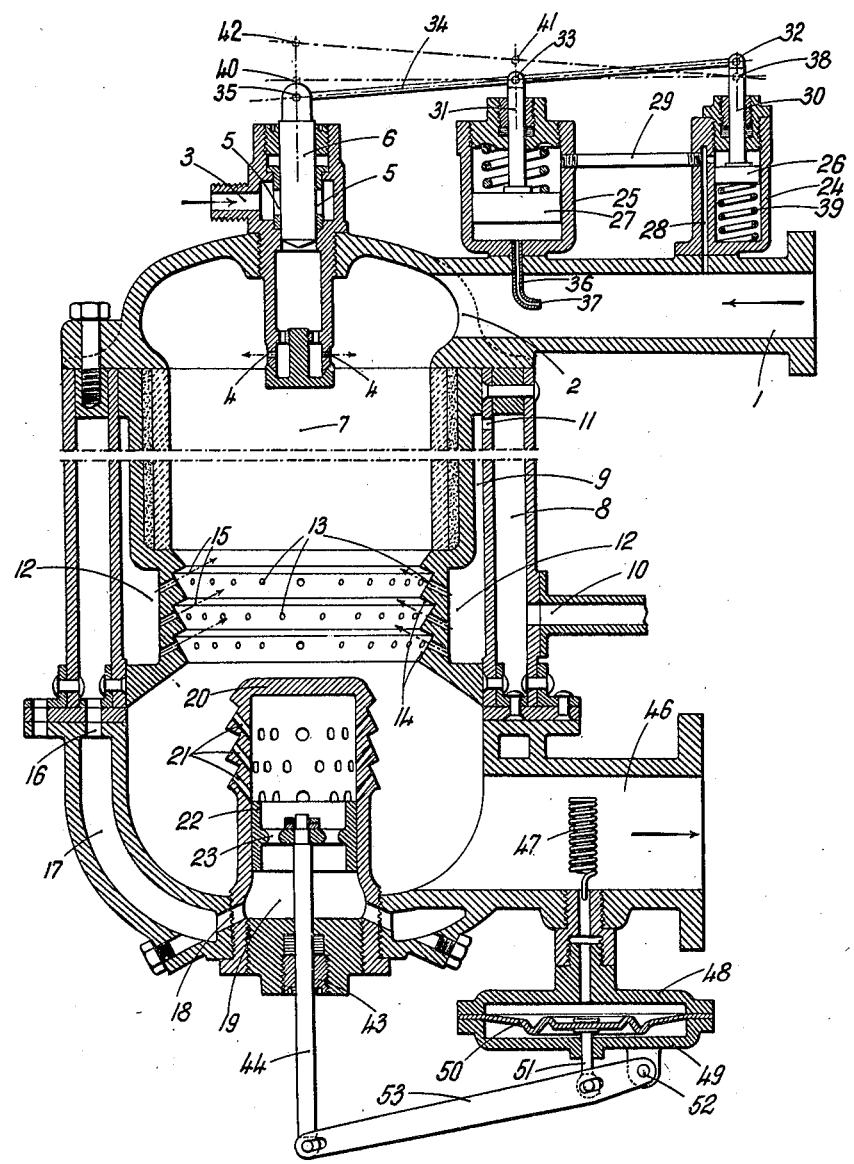

UNITED STATES PATENT OFFICE.

CHARLES LEMALE, OF PARIS, FRANCE.

FLASH STEAM-GENERATOR.

1,102,345.   Specification of Letters Patent.   Patented July 7, 1914.

Application filed November 6, 1912. Serial No. 729,828.

*To all whom it may concern:*

Be it known that I, CHARLES LEMALE, citizen of the French Republic, residing at Paris, Department of the Seine, in France, have invented certain new and useful Improvements in Flash Steam-Generators; and I do hereby declare the following to be a full, clear, and exact description of the invention, such as will enable others skilled in the art to which it appertains to make and use the same.

The invention relates to a flash steam generator which is automatically regulated in accordance with the fluctuations of the load on the supplied engine.

The disadvantages of petroleum-heated steam generators and their low efficiency can be attributed to the slow transmissibility of heat through metal, to the incomplete combustion of gases, to losses due to radiation, to the exhaust into the atmosphere of a large number of calories and especially to their independence in respect to the engines which they supply. The steam generator is, in fact, subjected in no way to the influence of the working conditions of the steam engine, conditions which vary constantly under the effect of the governor of the latter. Even if the admission valve is completely closed, the fuel still continues to burn in the furnace, which results in an important loss of calories without any compensation. The present invention eliminates these disadvantages by realizing a steam generator with immediate heat exchange between the combustion gases and the water, the latter receiving the heat necessary for its vaporization and which is automatically regulated so that the quantity of burnt fuel should be proportional, at any moment, to the power developed by the engine and that the working of the generator should be entirely subordinate to the working of the engine.

According to the invention, the combustion takes place, at a constant pressure, in a furnace surrounded by a water jacket which insulates it from the exterior air. The instantaneous vaporization is effected by distributing pulverized water in superposed sheets which are traversed, successively, by the combustion gases. To maintain the driving fluid, which is constituted by a mixture of gas and steam, at a constant temperature, the valve which controls the admission of water is connected to a pyrometric device placed in the path of driving fluid. The admissions of air and petroleum are also automatically regulated for all combustion speeds so as to maintain a constant proportion of carburation.

In order that the steam generator should be immediately influenced by a variation of the load, it is necessary that the motion of the flow of the mixture going to the engine, should automatically influence the quantity of fuel burnt at that instant, in the generator; and also to maintain a constant carburation by keeping the same, the proportions of air and petroleum entering the furnace. As regards the air, the quantity which passes during a unit of time is a function of its pressure and its velocity, and these two factors can constantly change according to the continuous variations in the working of the engine. If the load on the engine diminishes, the governor will throttle the admission of the mixture and the quantity passing will also diminish. There being no reservoir for controlling the output of steam, the air will sustain, at its admission into generator, a similar drop in velocity at constant pressure. It is necessary that at the same time, the quantity of admitted petroleum should be automatically reduced so as to maintain the same proportions in the carburation. However, if the load on the engine increases, the admission of the driving fluid also increases, which determines in the air admission conduit of the generator, an increase in velocity as well as a slight decrease in pressure. The quantity of petroleum has to be immediately increased to maintain the same proportions in the carburation. In both cases, the quantity of consumed fuel always remains proportional to the power of the engine, as it is the case in internal combustion engines, and an important saving will ensue.

The fluctuations in the output brought about by the working conditions of the engines must not alter the temperature of the driving fluid. Consequently, the admission of water is limited automatically and instantaneously, to the quantity which is to be vaporized to maintain the temperature constant and this occurs under all possible working conditions of the engine.

The accompanying drawing represents a device embodying the principal features of the invention.

Compressed air arrives through conduit 1 and reaches the upper part of the generator by passing through orifice 2. The petroleum arrives through conduit 3 and penetrates into the upper part of the generator and in the center thereof or through any suitable spraying device. It is circularly distributed in jets 4. But the admission of petroleum is only possible when the orifices 5 of a suitable distributing device are not closed by a piston plunger 6. The combustion takes place in the upper part of the generator constituting the furnace 7 which is completely surrounded by two concentric water jackets 8 and 9. Water circulates in the outer jacket 8, having entered through 10 and, on leaving jacket 8 penetrates through 11 into the inner jacket 12 where it is heated. The water thus previously heated, finally reaches the annular space 12, the inner wall of which comprises several rows of ascending passages or nozzles 13, directed toward the interior, and which are perforated in skewbacks 14 formed on the generator wall. The water already strongly heated and ready to be vaporized, enters the generator as very fine sprays 15 arranged in several superposed sheets. These jets being protected by the skew-backs 14 from the descending combustion gases, freely enter the furnace. The combustion takes place in the upper chamber of the generator and the ensuing very hot gases traverse, when descending, the several sheets of jets 15 so as to immediately vaporize the water. The remainder of water enters, for instance, through passage 16, a jacket 17, which surrounds the lower chamber of the generator, and descends through passages 18 into chamber 19 of the dome 20 situated in the center of the lower chamber of the generator. This dome also comprises several rows of superposed orifices or nozzles 21 which can be obstructed, in order to regulate the temperature of the gas and steam mixture, by a sleeve 22 sliding in the dome 20 and provided with passages 23 for the admission of water.

According to the quantity of the driving fluid required by the engine, the air arriving through conduit 1 sustains variations as it has been already explained, by varying either the velocity or the pressure. In order that the quantity of petroleum penetrating the generator should vary proportionally, the cross-sectional area of the petroleum admission ports must be varied proportionally to the product of the pressure and the velocity of the air in the conduit 1. To this end, two cylinders 24 and 25 have been provided on the conduit 1; said cylinders comprise two pistons 26 and 27, respectively, which can be moved by the pressure in the conduit 1. The part of the cylinder 24, which is above the piston 26, is connected to the conduit 1 by a passage 28; another pipe 29 is branched on the said passage and leads into the cylinder 25 above the piston 27. If there is no pressure in the conduit 1, the pistons 26 and 27 occupy the positions indicated in the drawing; the former being in its upper and the latter in its lower position and their respective piston rods 30 and 31 being in 32 and 33 respectively. A beam 34 joins the piston rods 30 and 31 to the head of the plunger 6. This head occupies the position 35 and consequently there is no admission of petroleum. The cylinder 25 below the piston 27, is provided with a branch pipe 36 having an end bent over in 37 and facing the current of air in the conduit 1 after the same manner as a Pitot tube.

If during the working, the admission valve of the supplied engine, is closed in order to stop it, the top end of the piston rod 30 will take the position 38, for the pressure in the conduit 1 will cause the piston 26 to drop and to compress the spring 39. On the other hand, the piston rod 31 will remain in the same position, namely 33, for there is no movement of air in the conduit 1 and air cannot penetrate in the cylinder 25, through nozzle 36, 37 and so lift the piston 27. But the head of the plunger 6 will take the position 40 in which the admission of petroleum is still cut off. However, if the admission valve of the engine opened, compressed air will enter through conduit 1 a higher pressure will be exerted on the under side of the piston 27 than on the upper side, owing to the Pitot tube; it follows that the difference in pressure between the two sides of the piston 27 will vary in proportion to the square of the velocity of air in the conduit 1. The top end of the piston rod 31 will reach 41, which position corresponds to the maximum input of air, and the head of the plunger 6 will be in its upper position at 42 such that the admission of petroleum will be fully on. For every decrease in velocity of the compressed air in conduit 1, the piston 6 will proportionally close the petroleum admission ports 5.

In order to regulate the temperature, the injection orifices 21 of the dome 20 can be successively obstructed by a special sleeve 22 mounted on a rod 44 sliding in a stuffing-box 43 and which is controlled by the following pyrometric device: A helical tube 47 is placed in the driving fluid pipe 46 leading to the engine; this tube 47 is filled with a vaporizing liquid, the pressure of which is proportional to the temperature of the driving fluid and which acts on a diaphragm 50 inclosed by the shells 48 and 49. The diaphragm 50 is deformed according to the temperature and its movement is transmittted to a rod 51 fixed onto said diaphragm; by means of the lever 53 pivoted in 52 and the rod 44, said rod 51 will move the sleeve 22 downward and if the temperature drops it will move the sleeve 22 upward, and the temperature of the driving fluid will thus be kept at its normal temperature.

It is evident that the generator will always automatically work at a constant temperature; the quantity of consumed fuel also being always proportional to power given by the supplied engine.

I claim:

1. A generator comprising a combustion chamber, means to admit fuel thereto, an outlet associated with the generator through which the gases formed by the combustion of the fuel pass, and an annular series of fluid nozzles disposed between the combustion chamber and said outlet and adapted to inject fluid jets inwardly toward the axis of said generator, and a second series of fluid nozzles disposed between said combustion chamber and said outlet and adapted to inject fluid jets outwardly toward the walls of said generator.

2. A generator comprising a combustion chamber, means to admit fuel thereto, an outlet associated with the generator through which the gases formed by the combustion of the fuel pass, means disposed between the combustion chamber and said outlet to inject a plurality of fluid jets into the generator which the gases are caused to traverse after leaving the combustion chamber and while on their way to the outlet, and means to protect said jets of fluid when first introduced to the generator.

3. A steam generator comprising a combustion chamber, means to admit fuel thereto, means to inject a plurality of fluid jets into said generator, and means controlled by the temperature of the mixture leaving the generator to determine the number of such fluid jets admitted to the generator.

4. A steam generator comprising a combustion chamber, means to admit fuel thereto, an outlet associated with the generator through which the gases formed by the combustion of the fuel pass, means to inject a plurality of fluid jets into said gases after leaving said combustion chamber, said jets being injected in a direction opposite to the direction of travel of said gases, and a jacket surrounding the generator through which said fluid circulates before being injected into the generator.

5. A steam generator comprising a combustion chamber, an air conduit associated with the generator to admit air to the combustion chamber, means to admit liquid fuel to the combustion chamber and means controlled both by the velocity and pressure of the air in said conduit to regulate the admission of fuel to said combustion chamber.

6. In a steam generator, the combination of a combustion chamber, means to admit liquid fuel thereto, an air conduit associated with the generator to admit air to the combustion chamber, and means to regulate said means comprising a regulating device controlled by the velocity of air in the conduit, a second regulating device controlled by the pressure of air in the conduit, and connections between said devices and said means whereby the admission of fuel to the combustion chamber depends upon the velocity and pressure of air in the air conduit.

In testimony whereof I affix my signature in presence of two witnesses.

CHARLES LEMALE.

Witnesses:
HANSON C. COXE,
LOUIS JOSSE.